United States Patent
Meglan et al.

(10) Patent No.: US 12,453,548 B2
(45) Date of Patent: Oct. 28, 2025

(54) METHOD AND SYSTEM FOR COLOR BASED INDICATION OF SUTURE STRAIN

(71) Applicant: Covidien LP, Mansfield, MA (US)

(72) Inventors: Dwight Meglan, Westwood, MA (US); Manish Pati, South Boston, MA (US); Cameron K. Cecil, Boston, MA (US)

(73) Assignee: Covidien LP, Mansfield, MA (US)

( * ) Notice: Subject to any disclaimer, the term of this patent is extended or adjusted under 35 U.S.C. 154(b) by 1084 days.

(21) Appl. No.: 17/437,875

(22) PCT Filed: Apr. 7, 2020

(86) PCT No.: PCT/US2020/026996
§ 371 (c)(1),
(2) Date: Sep. 10, 2021

(87) PCT Pub. No.: WO2020/210190
PCT Pub. Date: Oct. 15, 2020

(65) Prior Publication Data
US 2022/0167964 A1  Jun. 2, 2022

Related U.S. Application Data (60) Provisional application No. 62/833,183, filed on Apr. 12, 2019.

(51) Int. Cl.
*G06T 19/00* (2011.01)
*A61B 17/04* (2006.01)
(Continued)

(52) U.S. Cl.
CPC .... *A61B 17/0469* (2013.01); *A61B 17/06166* (2013.01); *A61B 34/30* (2016.02);
(Continued)

(58) Field of Classification Search
None
See application file for complete search history.

(56) References Cited

U.S. PATENT DOCUMENTS

| | | |
|---|---|---|
| 2007/0021738 A1 | 1/2007 | Hasser et al. |
| 2010/0094163 A1 | 4/2010 | Deladi et al. |
| | (Continued) | |

FOREIGN PATENT DOCUMENTS

| | | |
|---|---|---|
| CN | 109475387 A | 3/2019 |
| EP | 3155978 A2 | 4/2017 |
| | (Continued) | |

OTHER PUBLICATIONS

Akinbiyi et al. Dynamic Augmented Reality for Sensory Substitution in Robot-Assisted Surgical Systems, Sep. 3, 2006, p. 567-570 (Year: 2006).*

(Continued)

*Primary Examiner* — Robert J Craddock
(74) *Attorney, Agent, or Firm* — Carter, DeLuca & Farrell LLP (57) ABSTRACT

Methods and systems for providing a visual indication of suture strain include detecting a force applied to the suture; obtaining an image including the suture; identifying, based on at least one of an algorithm to convert a plurality of forces to a plurality of colors or in a table that associates a plurality of colors to a plurality of forces, respectively, a color associated with the force applied to the suture; generating an augmented version of the image; and displaying the augmented version of the image, where the identified color is used to represent at least a portion of the suture.

18 Claims, 5 Drawing Sheets

(51) Int. Cl.
  *A61B 17/06* (2006.01)
  *A61B 34/30* (2016.01)
  *A61B 90/00* (2016.01)
  *A61B 90/92* (2016.01)

(52) U.S. Cl.
  CPC .............. *A61B 90/06* (2016.02); *A61B 90/37* (2016.02); *A61B 90/92* (2016.02); *G06T 19/006* (2013.01); *A61B 2017/0496* (2013.01); *A61B 2034/301* (2016.02); *A61B 2090/066* (2016.02); *A61B 2090/365* (2016.02)

(56) References Cited

U.S. PATENT DOCUMENTS

| | | |
|---|---|---|
| 2011/0319932 A1 | 12/2011 | Avelar et al. |
| 2014/0039527 A1 | 2/2014 | Avelar et al. |
| 2017/0128041 A1 | 5/2017 | Hasser et al. |
| 2018/0338803 A1 | 11/2018 | Meglan |
| 2018/0338806 A1 | 11/2018 | Grubbs |
| 2022/0265372 A1* | 8/2022 | Hufford ................. A61B 34/30 |

FOREIGN PATENT DOCUMENTS

| | | |
|---|---|---|
| WO | 2011090628 A2 | 7/2011 |
| WO | 2017087439 A1 | 5/2017 |
| WO | 2018217407 A1 | 11/2018 |
| WO | 2018217433 A1 | 11/2018 |

OTHER PUBLICATIONS

Extended European Search Report dated Dec. 8, 2022 corresponding to counterpart Patent Application EP 20787183.1.
Chinese First Office Action for Application No. 202080027593.4 dated Nov. 13, 2023 with English translation, 17 pages.
Decision of Rejection for Chinese Application No. 2020800275934 dated Jun. 25, 2024 with English translation, 8 pages.
International Search Report mailed Jul. 21, 2020 and Written Opinion completed Jul. 21, 2020 corresponding to counterpart Int'l Patent Application PCT/US2020/026996.

* cited by examiner

METHOD AND SYSTEM FOR COLOR BASED INDICATION OF SUTURE STRAIN

CROSS-REFERENCE TO RELATED APPLICATIONS

The present application is a U.S. National Stage Application filed under 35 U.S.C. § 371(a) claiming the benefit of and priority to International Patent Application No. PCT/US2020/026996, filed Apr. 7, 2020, which claims the benefit of and priority to U.S. Provisional Patent Application Ser. No. 62/833,183, filed Apr. 12, 2019, the entire disclosures of each of which being incorporated by reference herein.

BACKGROUND

Robotic surgical systems have been developed for use in minimally invasive medical procedures. During such medical procedures, the robotic surgical system is controlled by a surgeon or clinician interfacing with a user interface of the robotic surgical system. The user interface or console allows the clinician to manipulate an end effector associated with the surgical system acting on the patient. The user console includes one or more control arms which support an input handle or gimbal that is movable by the clinician to control the robotic surgical system. Using the console, the surgeon controls the position and movement of the end effectors thereby performing various tasks needed to complete a surgical procedure, including, in some instances, applying sutures to approximate tissue.

When a suture is being placed under force for tissue approximation during a procedure, it can be useful to know the force to which the suture is being exposed. As such, there is a need for improved systems and methods for indicating suture strain.

SUMMARY

The present disclosure relates generally to methods and systems that provide a color based indication of suture strain during minimally invasive surgery. In accordance with one example aspect, the present disclosure describes a method for visual indication of suture strain. The method includes detecting a force applied to a suture; obtaining an image, the image including the suture; identifying, based on at least one of an algorithm to convert a plurality of forces to a plurality of colors or in a table that associates a plurality of colors to a plurality of forces, respectively, a color associated with the force applied to the suture; generating an augmented version of the image wherein the identified color is used to represent at least a portion of the suture; and displaying the augmented version of the image.

According to aspects of the present disclosure, the displaying of the augmented version of the image includes displaying a visual indicator overlaid on top of the suture that indicate whether the force applied to the suture should be increased, decreased, or held at a current level.

In another aspect of the present disclosure, the displaying of the augmented version of the image includes replacing the image of the suture with the augmented version of the image.

In another aspect of the present disclosure, the displaying of the augmented version of the image includes shading the augmented version of the image based on the detected force.

In a further aspect, the color indicates whether the detected force is within a target range.

In yet a further aspect, the displaying of the augmented version of the image includes displaying a legend indicating how color corresponds to force.

In another aspect, the detecting of the force applied to the suture is performed by way of sensors located in a surgical instrument and configured to detect force.

In yet another aspect, the detecting of the force applied to the suture is performed by way of torque sensors located in an instrument drive unit and configured to detect force.

In another aspect, the detecting of the force applied to the suture includes detecting the force based on a geometry of a tool and the suture during tensioning of the suture.

Another aspect of the present disclosure relates to a robotic surgery system. The system includes a plurality of robotic arms configured to place a suture, a robotic arm including an endoscope configured to view placement of the suture and communicate an image of the suture to a display, a processor, and memory coupled to the processor. The memory stores instructions which, when executed by the processor, cause the robotic surgery system to: detect a force applied to the suture; identify, in a table that associates a plurality of colors to a plurality of forces, respectively, a color associated with the force applied to the suture; generate an augmented version of the image, wherein the identified color is used to represent at least a portion of the suture; and display the augmented version of the image.

In an aspect of the present disclosure, the displaying of the augmented version of the image includes displaying a visual indicator having arrows overlaid on top of the suture that indicate whether the detected force applied to the suture should be increased, decreased, or held at the current level.

In another aspect, the displaying of the augmented version of the image includes replacing the image of the suture with the augmented version of the image. In yet another aspect, the displaying of the augmented version of the image includes shading the augmented version of the image based on the detected force.

In another aspect, the color indicates whether the detected force is within a target range.

In yet another aspect, the displaying of the augmented version of the image includes displaying a legend indicating how color corresponds to force.

In another aspect, the detecting of the force applied to the suture is performed by a sensor located on a surgical instrument associated with one of the plurality of robotic arms and configured to detect force applied to the suture and communicate the detected force to the processor and memory.

In another aspect of the present disclosure, the detecting of the force applied to the suture is performed by a torque sensor configured to detect the force applied to the suture and communicate the detected force to the processor and memory.

In another aspect, the present disclosure describes a laparoscopic surgery system. The system includes a plurality of laparoscopic instruments configured to place a suture, an endoscope, a processor, and memory coupled to the one or more processors. The endoscope is configured to view placement of the suture and communicate an image of the suture to a display. The memory stores instructions which, when executed by the processor, cause the laparoscopic surgery system to: detect a force applied to the suture; identify, in a table that associates a plurality of colors to a plurality of forces, respectively, a color associated with the force applied to the suture; generate an augmented version of the image wherein the identified color is used to represent at least a portion of the suture; and display the augmented version of the image.

In another aspect, the detecting of the force applied to the suture is performed by a sensor on one of the plurality of laparoscopic instruments, the sensor configured to detect the force applied to the suture and communicate the force to the processor and memory.

In yet another aspect, the color indicates whether the force is within a target range.

BRIEF DESCRIPTION OF THE DRAWINGS

The accompanying drawings, which are incorporated in and constitute a part of this specification, illustrate embodiments of the present disclosure and, together with the detailed description of the embodiments given below, serve to explain the principles of the disclosure.

DETAILED DESCRIPTION

Embodiments of the present systems and methods for color based indication of suture strain during minimally invasive surgery are described in detail with reference to the drawings, in which like reference numerals designate identical or corresponding elements in each of the several views. As used herein, the term "clinician" refers to a doctor, nurse, healthcare provider, support personnel, or other operators of the robotic surgical system described herein. As used herein, the term "surgical field" refers to the space in which the surgical robot operates. Such space may include, but is not limited to, an operating room, surgical robot storage and/or maintenance facility, or other such spaces. As used herein, the term "pose" refers to a position and orientation of a component within space or a workspace.

Figure 1:
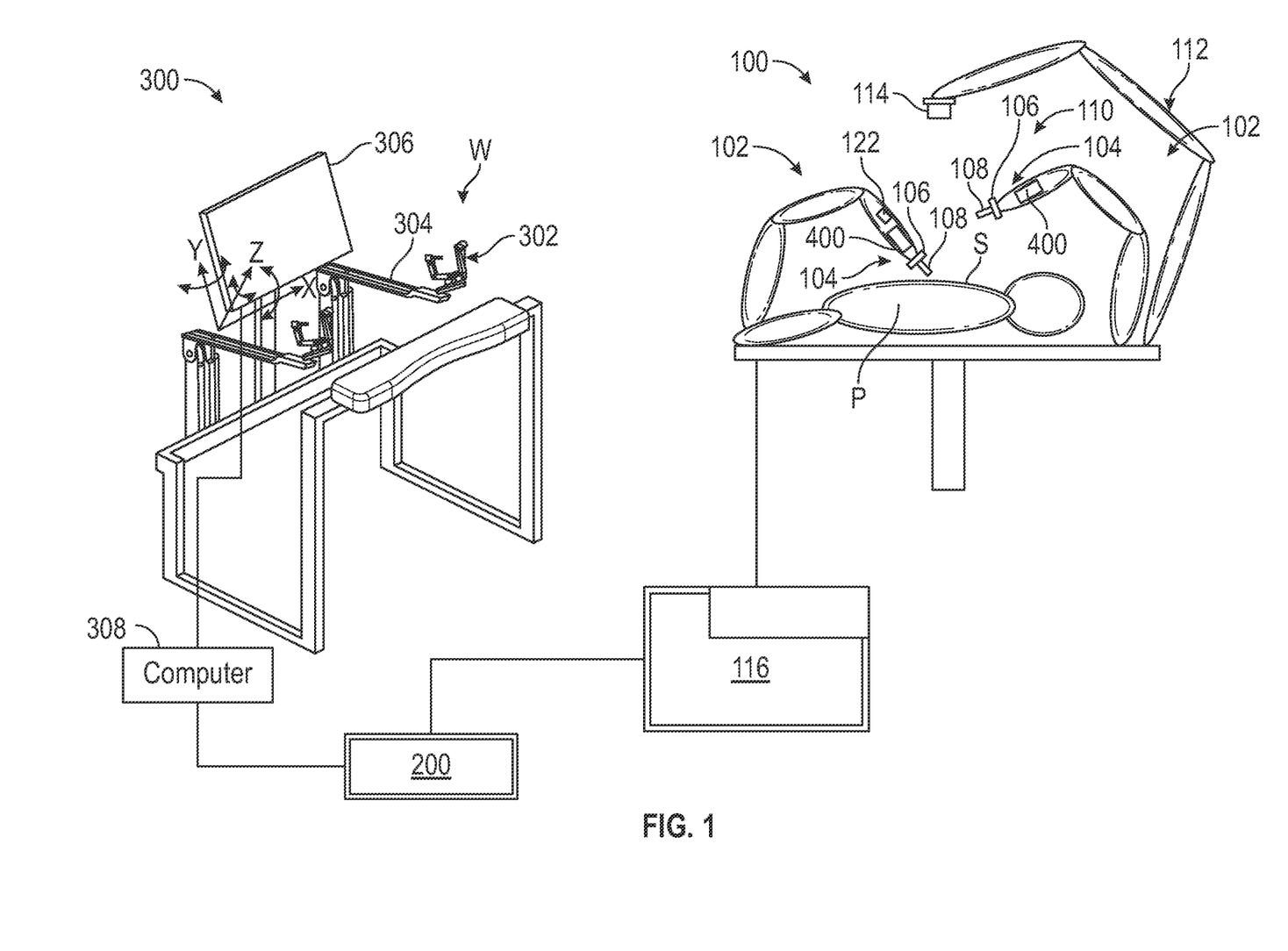
FIG. 1 is a schematic view of a robotic surgical system having a user console and a surgical robot provided in accordance with an exemplary embodiment of the present disclosure.

The present disclosure relates generally to methods and systems that provide a color based indication of suture strain during minimally invasive surgery. Referring initially to FIG. 1, a robotic surgical system in accordance with the present disclosure is shown generally as robotic surgical system 1 and includes a surgical robot 100, a controller 200, and a user interface or console 300.

The surgical robot 100 generally includes a robotic cart or tower 116 which is coupled to linkages 112. The linkages 112 form robotic arms 102 and may moveably support an end effector or tool 108 that is configured to act on tissue of the patient "P." Each robotic arm 102 may have an end portion 104 that supports the tool 108 in a manner that renders the tool 108 removable or interchangeable. In addition, the end portions 104 of the robotic arms 102 may include an imaging device 106 to image a surgical site "S." Further, the end portions 104 of the robotic arms 102 include one or more motors 122 that apply forces about joints "J" (FIG. 2) of the robotic arm 102 to move and/or actuate the tools 108.

The console 300 communicates with the tower 116 via the controller 200. The console 300 includes a display 306 that is configured to display images, which may be two-dimensional images or three-dimensional images, and which may include data captured by imaging devices 106, 114 positioned about the surgical field, e.g., an imaging device positioned within the surgical site "S", an imaging device positioned adjacent to the patient "P," and/or an imaging device 114 supported by an end portion 104 of a robotic arm 102. The imaging devices, e.g., imaging devices 106, 114, may capture visual images, infra-red images, ultrasound images, X-ray images, thermal images, and/or any other known real-time images of the surgical site "S." The imaging devices 106, 114 transmit captured imaging data to the controller 200 which generates images of the surgical site "S" in real-time from the imaging data and transmits the images to the display 306 for display. It is contemplated that an endoscope may be used as an imaging device 106.

The console 300 includes control arms 304 which moveably support input handles 302 in a workspace "W." The control arms 304 allow a clinician to manipulate the surgical robot 100, e.g., move the robotic arms 102, the ends 104 of the robotic arms 102, and/or the tools 108. Each of the input handles 302 is in communication with the controller 200 to transmit input signals thereto and receive output or feedback signals therefrom. Additionally or alternatively, each of the input handles 302 allows the surgeon to manipulate, e.g., clamp, grasp, fire, open, close, rotate, thrust, slice, etc., the tools 108 supported at the ends 104 of the robotic arms 102.

With continued reference to FIG. 1, motion of each of the input handles 302 through the workspace "W" moves the ends 104 of the robotic arms 102 and/or tools 108 within a surgical site "S." The images on the display 306 are oriented such that movement of the input handles 302 moves the ends 104 of the robotic arms 102 as viewed on the display 306. The images may remain stationary while movement of the input handles 302 is scaled to movement of the ends 104 of the robotic arms 102 within the images. To maintain an orientation of the images, kinematic mapping of the input handles 302 is based on a camera orientation relative to an orientation of the ends 104 of the robotic arm 102. The orientation of the images on the display 306 may be mirrored or rotated relative to a view from above the patient "P." In addition, the size of the images on the display 306 may be scaled to be larger or smaller than the actual structures of the surgical site "S" permitting the clinician to have a better view of structures therein. As the input handles 302 are moved, the tools 108 are moved within the surgical site "S" as detailed below. Movement of the tools 108 may also include movement of the ends 104 of the robotic arms 102 which support the tools 108.

The movement of the input handles 302 may be scaled relative to the movement of the tools 108. When the input handles 302 are moved within the workspace "W," the control arm 304 transmits encoder signals to the controller 200, which analyzes the encoder signals and generates control signals to move the tools 108 in response to the encoder signals. The controller 200 transmits control signals to the tower 116 to move the tools 108 in response to the movement of the input handles 302. Prior to transmission of the control signals, the controller 200 scales the encoder signals by dividing an $Input_{distance}$, e.g., the distance moved by one of the input handles 302 within the workspace "W," by a scaling factor $S_F$ to arrive at a scaled $Output_{distance}$, e.g., the distance that one of the ends 104 is moved. The scaling factor $S_F$ may be in a range between about 1 and about 10, in embodiments, about 3. This scaling is represented by the following equation:

$$\text{Output}_{distance} = \text{Input}_{distance} / S_F$$

After the encoder signal is scaled, the controller 200 transmits control signals corresponding to the scaled encoder signal to the tower 116 to move the tools 108 accordingly. It will be appreciated that the larger the scaling factor $S_F$ the smaller the movement of the tools 108 relative to the movement of the input handles 302.

Figure 2:
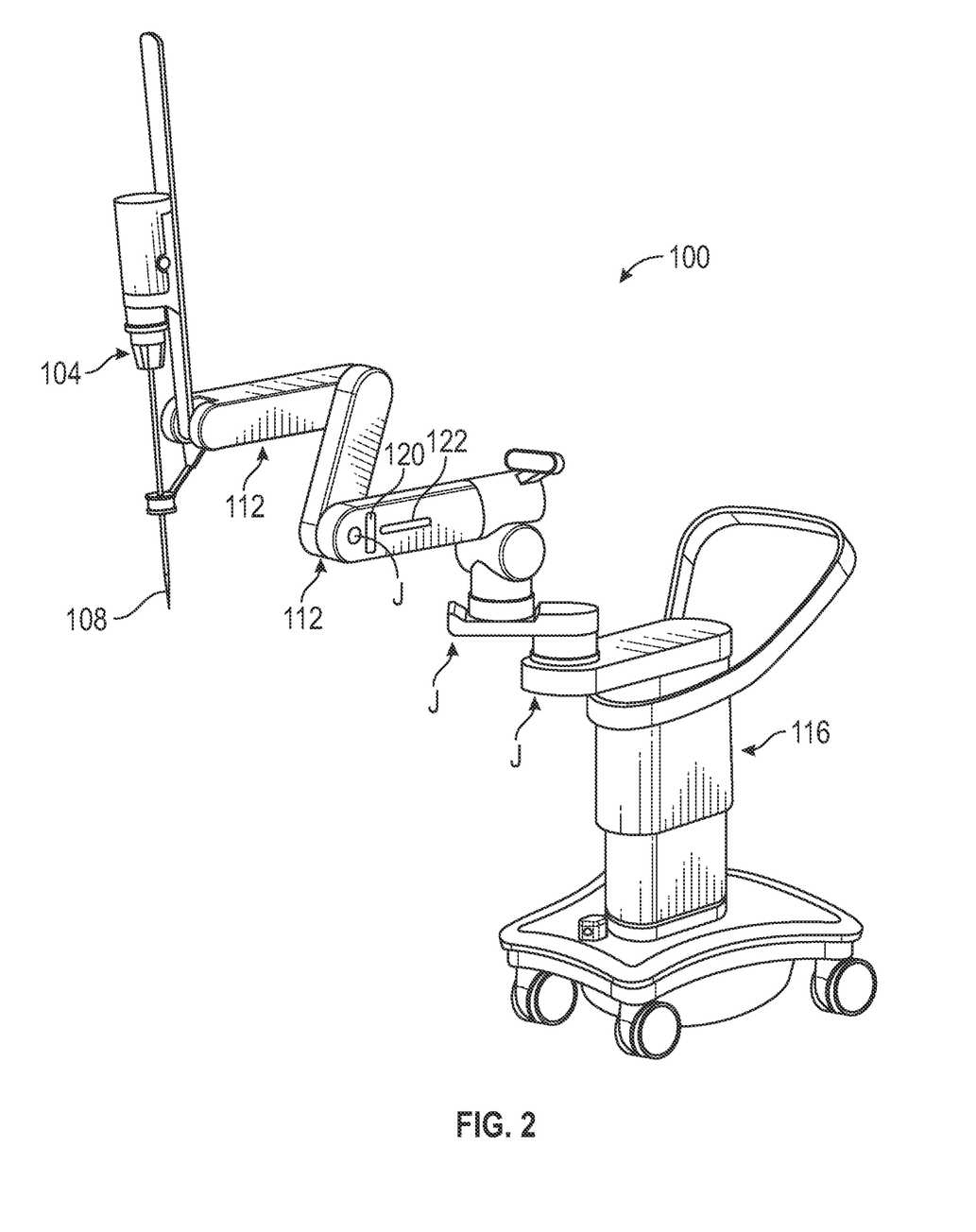
FIG. 2 is a perspective view of an example tower of the surgical robot of FIG. 1.

Referring to FIG. 2, the surgical robot 100 includes the robotic cart or tower 116 supporting the linkages 112 which support the tool 108. The linkages 112 include one or more motors 122 that are each associated with a respective joint "J" of the linkage 112, to manipulate the linkage 112 and/or the tool 108 supported by the linkage 112.

In use, the controller 200 (FIG. 1) transmits control signals to the surgical robot 100. The surgical robot 100 activates a motor 122 to apply a force about or to a respective joint "J" in response to the control signals. Specifically, in response to a control signal, the surgical robot 100 delivers a power current to the motor 122 which applies a force to the joint "J" to move the linkage 112 and/or the tool 108 during a surgical procedure. Additionally, a sensor 120 is coupled to the joint "J" and measures a torque about the joint "J" in response to application of the force to the joint "J." The sensor 120 transmits the measured force to the controller 200 (FIG. 1).

Figure 3:
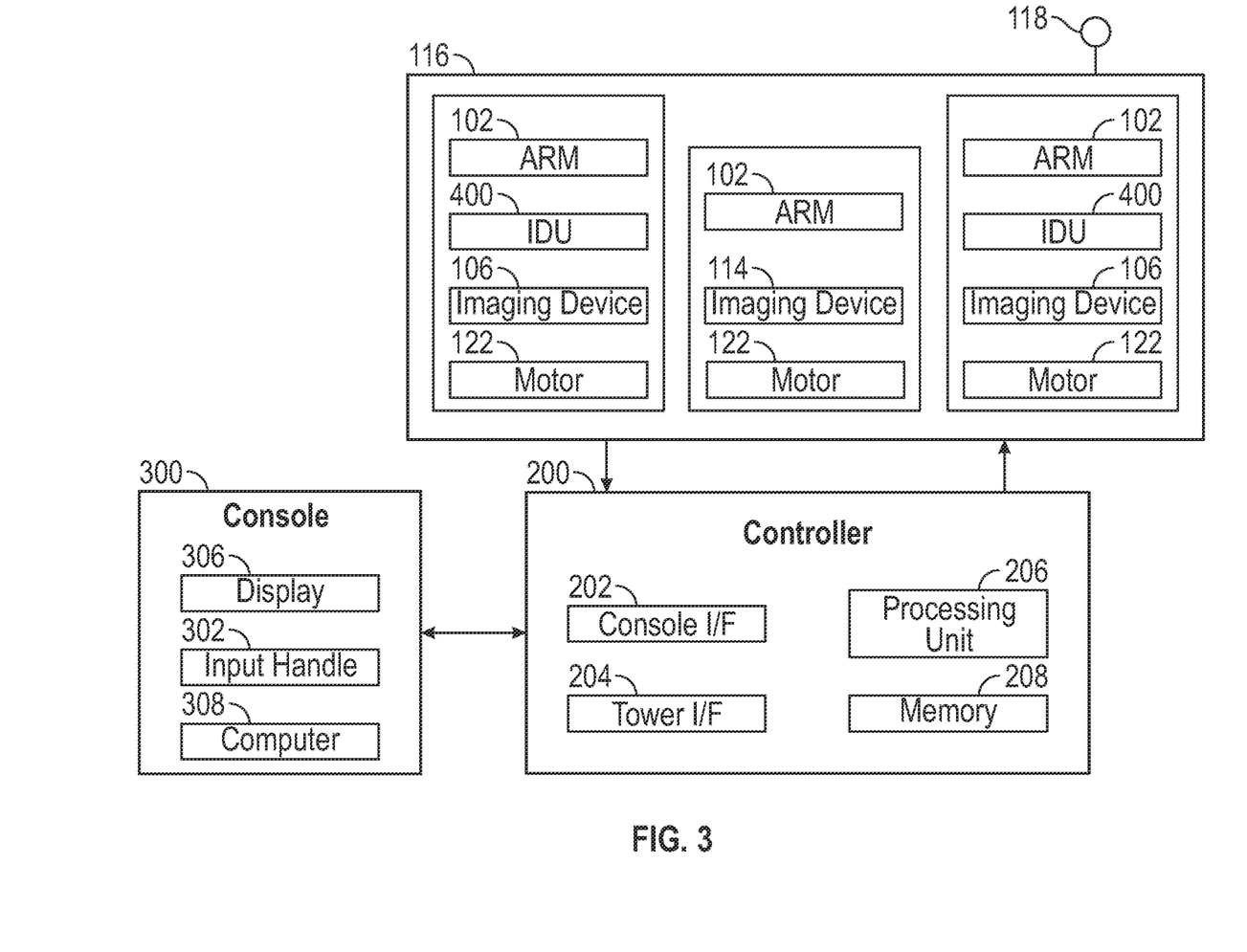
FIG. 3 is a functional block diagram of an example system architecture for controlling the robotic surgical system of FIG. 1.

With reference to FIG. 3, communication between the surgical robot 100, the console 300, and the controller 200 is described in accordance with the present disclosure. The controller 200 is in communication with the tower 116 of the surgical robot 100 to provide instructions for operation of the surgical robot 100 in response to encoder signals received from the console 300.

The controller 200 generally includes a processing unit 206, a memory 208, a tower interface 204, and a console interface 202. The processing unit 206 executes instructions or a computer program stored in the memory 208 which functions to cause components of the tower 116, e.g., linkages 112, to execute desired movements according to movement defined by the input handle 302 of the console 300. In this regard, the processing unit 206 includes any suitable logic control circuit adapted to perform calculations and/or operate according to a set of instructions. The processing unit 206 may include one or more processing devices (not shown) such as a microprocessor or other physical device capable of executing instructions stored in the memory 208 and/or processing data. The memory 208 may include transitory type memory, e.g., RAM, and/or non-transitory type memory, e.g., flash media or disk media. The tower interface 204 and console interface 202 communicate with the tower 116 and console 300, respectively, via either wireless configurations, e.g., radio frequency, optical, WIFI, Bluetooth® (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 802.15.4-2003 standard for wireless personal area networks (WPANs)), etc., and/or wired configurations. Although depicted as a separate module, the console interface 202 and tower interface 204 may be a single component.

With continued reference to FIGS. 2-3, the tower 116 includes a communications interface 118 that receives communications and/or data from the tower interface 204. The communications interface 118 transmits signals which manipulate the motor 122 to move the linkages 112 associated with the tower 116. The motor 122 may be located in the robotic arm 102 and/or the linkages 112. In embodiments, the motor 122 mechanically manipulates the robotic arm 102, the linkages 112, and/or the tool 108 (FIG. 1) in response to power supplied to the motor 122. Mechanical manipulation of the robotic arm 102, linkages 112, and/or the tool 108 may include application of force from the motor 122 to move the robotic arm 102 and/or the tool 108 coupled to the robotic arm 102, in response to instructions from the processing unit 206. For example, the motor 122 may be operably coupled to a joint "J" via cables (not shown) to manipulate the robotic arm 102.

The console 300 includes a computer 308 to receive encoder signals from position sensors or encoders, transmit the encoder signals to the controller 200, and receive control signals from the controller 200 to move members, e.g. the of the control arm 304, about joints. Each input handle 302 is coupled to the control arm 304. The control arm 304 includes a first, second, and third drives motors 324, 326, 328 that are in either wired or wireless communication with the computer 308. The encoders (not shown) are disposed in the drive motors 324, 326, 328, respectively, and are configured to generate encoder signals representative of the pose of the members of the control arm 304 associated with joints (not shown). The encoder signals representing the pose of the members of the control arm 304 about joints (not shown) are transmitted by the encoders $E_1$, $E_2$, $E_3$ to the computer 308 which transmits the encoder signals to the controller 200. In response to the encoder signals, the controller 200 transmits control signals to the tower 116 to affect motion of the robotic arm 102 and/or the tools 108 as detailed above.

The input handle 302 may be a handle, a pedal, or a computer accessory (e.g., a keyboard, joystick, mouse, button, touch screen, switch, trackball, etc.). The display 306 displays images or other data received from the controller 200 to communicate data to the clinician. The computer 308 includes a processing unit and memory (not shown) which includes data, instructions, and/or information related to the various components, algorithms, and/or operations of the tower 116 and can operate using any suitable electronic service, database, platform, cloud, or the like. The computer 308 may include processing units (not shown) which include any suitable logic control circuit adapted to perform calculations and/or operate according to a set of instructions located in memory (not shown) as described similarly with reference to the controller 200.

It is contemplated that other surgical systems and instruments can be utilized, such as laparoscopic surgical systems. While the disclosed embodiments contemplate location of a controller 200 external to a surgical robot 100, it is contemplated that the controller 200 may be located within the control arm 304, or alternatively that elements of the robotic surgical system 1 may include circuitry which executes the described encoder measurements and calculations independent of the controller 200.

Figure 4:
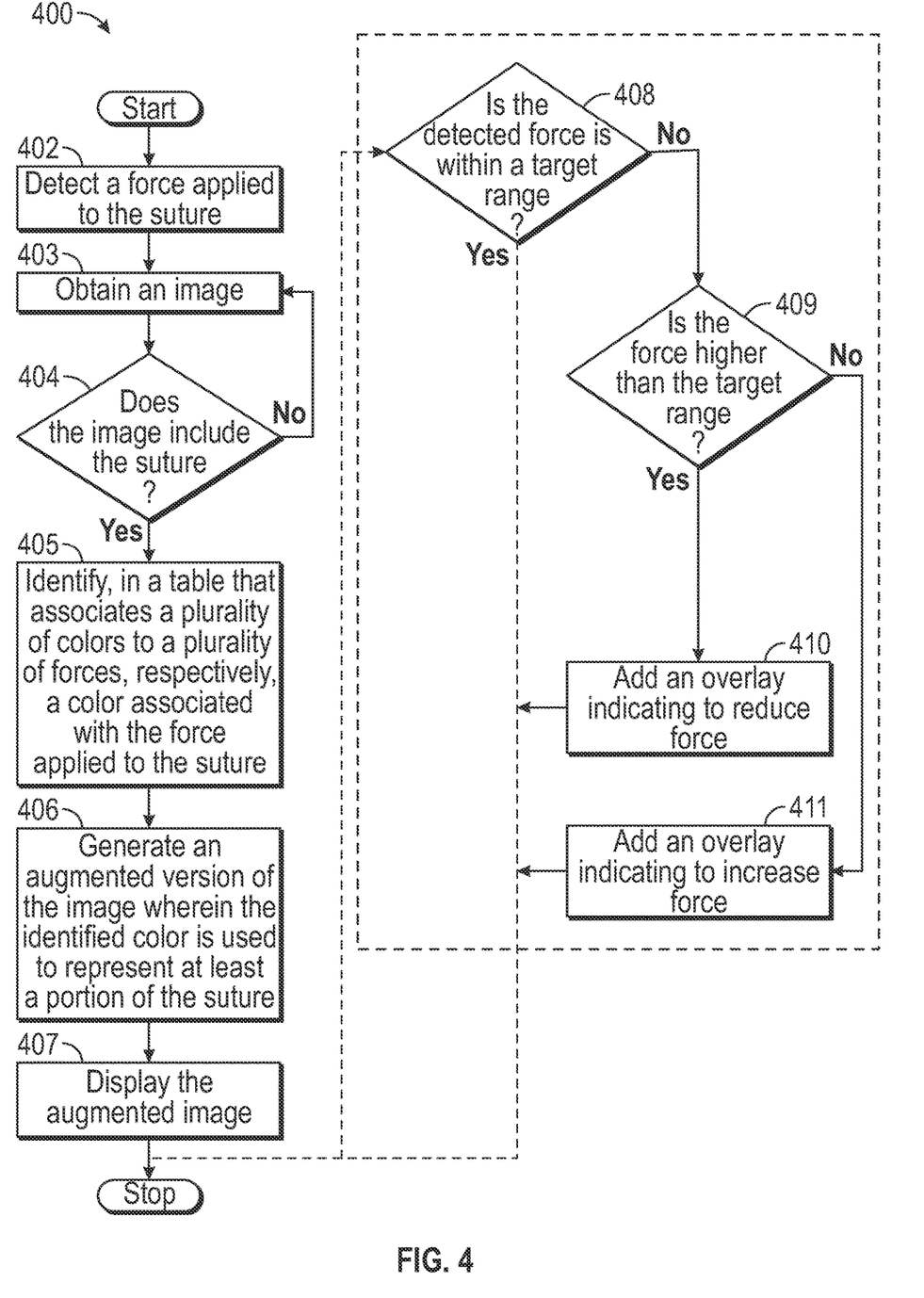
FIG. 4 is a flow chart showing an example method for color based indication of suture strain.

Referring to FIG. 4, a method 400 for visual indication of suture strain is described in accordance with the present disclosure. During minimally invasive surgery, when a suture 503 (FIG. 5) is being placed under force as part of the process of using it for tissue approximation during a procedure, it can be useful to know the force to which the suture 503 is being exposed. At block 402, the sensor 120 measures the force applied to the suture and transmits the measured force to the controller 200 (FIG. 1). For example, the force on the suture can be sensed or estimated either from the loads on the surgical instruments inferred from the torque sensors 120 in the instrument drive unit (IDU), or by having directly placed sensors in the surgical instruments. In an embodiment, the sutures themselves may also be directly instrumented. In another embodiment, the use of mutual geometry of the tools and the suture during the tensioning of the suture as part of knot tying may be used to extract information about the forces on the suture. The suture is tensioned during the knot tying process. The dynamic structure of the loads is such that the tools are holding either end of the suture while it is connected to the knot point. This provides an analytic model by which the mutually shared forces can be computed in detail.

At block 403, the imaging devices 106, 114 capture imaging data and transmit the captured imaging data to the controller 200. At block 404, the controller 200 determines whether the imaging data includes at least a portion of a suture. If it is determined that the imaging data does not contain at least a portion of a suture ("No" at block 404), then control passes back to block 403, at which the image is recaptured by the imaging devices 106, 114 and retransmitted to the controller 200. The imaging devices 106, 114, for example, may be located at the end of a robotic arm, or on the end portion of a laparoscopic instrument.

If it is determined that the imaging data does contain at least a portion of a suture ("Yes" at block 404), then control passes to block 405. At block 405, a table that associates colors to a respective force is identified. It is contemplated that the table may use gradients, shades, discrete colors, or any arrangement that could be used to show a difference. For example, a high amount of force may be associated with a light color such as orange/yellow, and a light amount of force may be associated with a dark color such as purple/blue. In various embodiments, a formula, that does not require a lookup table, may be used to convert force into colors. The force applied to the suture as detected by the sensor 120 is associated with a color. At block 405 the controller 200 generates an augmented version of the image. The identified color is used by the controller at block 406 to represent at least a portion of the suture. At block 407 the augmented version of the image is then communicated by the controller 200 to the display 306 and displayed. In an optional step, at block 408 the controller 200 determines whether the detected force is within a target range. If it is determined that the detected force is within a target range, ("Yes" at block 408) then control passes to block 405. If it is determined that the detected force does not fall within a target range ("No" at block 408), then at block 409 the controller 200 determines whether the force is higher than the target range. If it is determined that the force is higher than the target range ("Yes" at block 409), then at block 410, an overlay is added to the display to indicate that a reduction in force may be needed. If it is determined that the force is lower than the target range ("No" at block 409), then at block 411, an overlay is added to the display to indicate that an increase in force may be needed. For example, this indication can be an arrow pointing up for a force that is lower than the target range, or an arrow down for a force that is higher than the target range. This may act as a guide to assist the surgeon in knowing how much force should be applied to the suture. In various embodiments, the indicator may include a sphere that gets bigger or smaller to indicate a force that is higher or lower than the target range. In various embodiments, the indicator may include a graphic that oscillates and changes oscillation frequency to indicate a force that is higher or lower than the target range.

Figure 5:
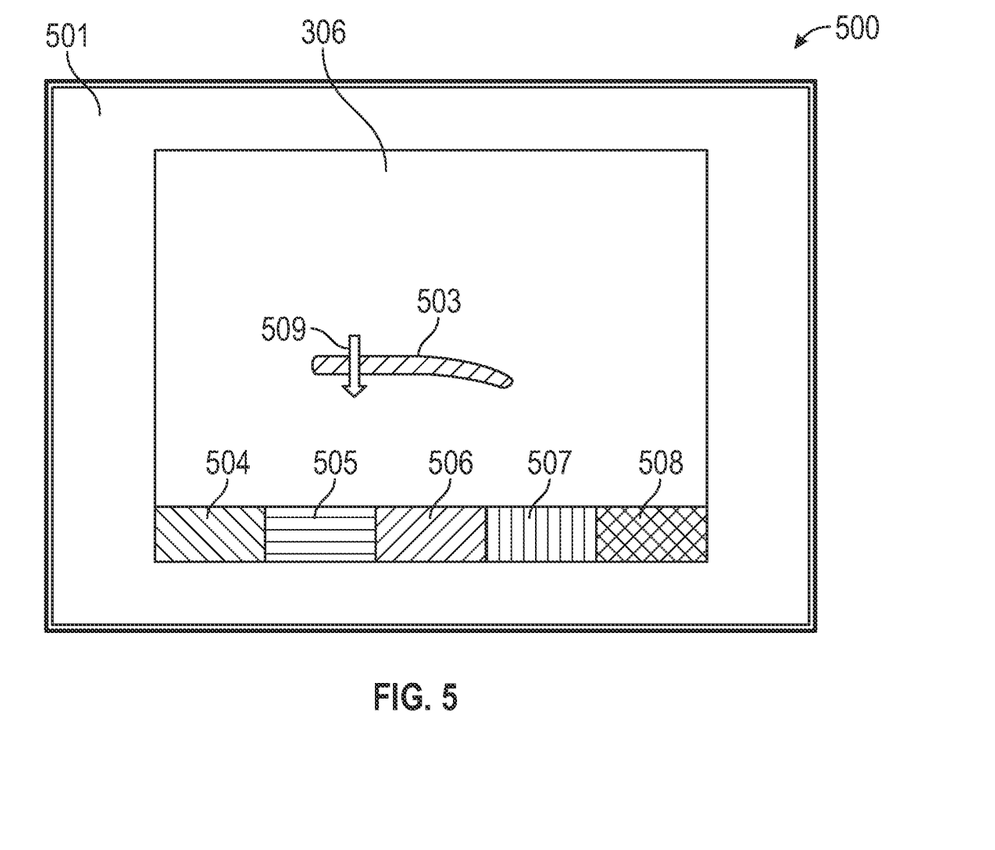
FIG. 5 is an example screen shot that may be generated according to the method of FIG. 4, in accordance with an example embodiment of the present disclosure.

Referring to FIG. 5, an example screen shot for color based indication of suture strain, which may be displayed at block 407 (FIG. 4), is shown. A display 306 (of FIG. 1) of the console 300 (of FIG. 1) displays an image of the portion of the patient 501 undergoing a procedure, the image containing at least a portion of a suture 503. In an embodiment, each of the shadings 504-508 represents a respective color that is associated with a respective force, for example, with the shadings 504-508 progressing from shades of green to yellow to red as the force increases. It is contemplated that gray scale, shadings, or other patterns could be associated with a respective force.

In an embodiment, the pixels occupied by the suture 503 can be isolated in the image using computer vision techniques such as identifying the unique color of the structure as well as taking into account continuity relationships such as that the suture 503 is a continuous structure with a known consistent diameter. The display color of the suture 503 can be adjusted to reflect the force by substituting the force appropriate color into the display for the pixels which represent the suture. In other embodiments, gray scale, shading, or patterns could be used instead of or in addition to colors.

In another embodiment, the coloration of the suture 503 in the augmented image can act as a target guide for how much force a surgeon should place on the suture 503 to achieve the desired result. For example, the color may be shown as blue when the detected force applied to the suture 503 is in the target range, and other colors when the detected force is too high or too low. Should force level targeting be desired, such as during knot tightening, different types of visible indicators could be displayed such as the suture color as well as arrows 509 overlaid on the suture 503 that indicate whether the force applied to the suture 503 should be increased, decreased, or held at the current level. It is contemplated that these display techniques could have target bands such that the arrows and or colors do not readily change as long as the suture force is within this band. Such target bands may prevent the display from changing at a distracting rate.

As detailed above, the console 300 is in operable communication with the surgical robot 100 to perform a surgical procedure on a patient; however, it is envisioned that the console 300 may be in operable communication with a surgical simulator (not shown) to virtually actuate a surgical robot and/or tool in a simulated environment. For example, the robotic surgical system 1 may have a first mode in which the console 300 is coupled to actuate the surgical robot 100 and a second mode in which the display 306 is coupled to the surgical simulator to virtually actuate a robotic surgical system. The surgical simulator may be a standalone unit or be integrated into the controller 200. The surgical simulator virtually responds to a clinician interfacing with the console 300 by providing visual, audible, force, and/or haptic feedback to a clinician through the console 300. For example, as a clinician interfaces with the input handles 302, the surgical simulator moves representative tools that are virtually acting on tissue. It is envisioned that the surgical simulator may allow a clinician to practice a surgical procedure before performing the surgical procedure on a patient. In addition, the surgical simulator may be used to train a clinician on a surgical procedure. Further, the surgical simulator may simulate "complications" during a proposed surgical procedure to permit a clinician to plan a surgical procedure.

Additionally, while the application refers to members of the control arm as receiving and propagating forces received by the input handle through transmission components generally, the identified members of the control arm have been identified for illustrative purposes only and are not intended to limit the disclosure. As such, members of the control arm should be understood generally to be components of the control arm 304 which may receive forces exerted by a clinician thereon. Likewise, the identified transmission components are identified for illustrative purposes only and are not intended to limit the disclosure. As such, transmission components should be understood generally to be components which propagate forces received by members of the input components to the first, second, and/or third drive motors 324, 326, 328.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A method for visual indication of suture strain comprising:
   detecting a force applied to a suture by a laparoscopic instrument configured to place the suture;
   obtaining an image, the image including the suture;
   identifying a color associated with the force applied to the suture based on at least one of:
      an algorithm to convert a plurality of forces to a plurality of colors; or
      in a table that associates a plurality of colors to a plurality of forces, respectively;
   generating an augmented version of the image wherein the identified color is used to represent and overlay at least a portion of the suture; and
   displaying the augmented version of the image including displaying a legend indicating how color corresponds to force.

2. The method of claim 1, wherein the displaying the augmented version of the image includes displaying a visual indicator overlaid on top of the suture that indicate whether the detected force should be increased, decreased, or held at a current level.

3. The method of claim 1, wherein the displaying the augmented version of the image includes replacing the image of the suture with the augmented version of the image.

4. The method of claim 1, wherein the displaying the augmented version of the image includes shading the augmented version of the image based on the detected force.

5. The method of claim 1, wherein the color indicates whether the detected force is within a target range.

6. The method of claim 1, wherein the detecting of the force applied to the suture is performed by way of sensors located in a surgical instrument and configured to detect force.

7. The method of claim 1, wherein the detecting of the force applied to the suture is performed by way of torque sensors located in an instrument drive unit and configured to detect force.

8. The method of claim 1, wherein the detecting of the force applied to the suture includes detecting the force based on a geometry of a tool and the suture during tensioning of the suture.

9. A robotic surgery system comprising:
   a plurality of robotic arms configured to place a suture;
   a robotic arm including an endoscope configured to view placement of the suture and communicate an image of the suture to a display;
   a processor; and
   a memory coupled to the processor, the memory storing instructions which, when executed by the processor, cause the robotic surgery system to:
   detect a force applied to the suture;
   identify, in a table that associates a plurality of colors to a plurality of forces, respectively, a color associated with the force applied to the suture;
   generate an augmented version of the image wherein the identified color is used to represent at least a portion of the suture; and
   display the augmented version of the image, wherein the displaying of the augmented version of the image includes displaying a visual indicator having arrows overlaid on top of the suture that indicate whether the detected force applied to the suture should be increased, decreased, or held at a current level.

10. The robotic surgery system of claim 9, wherein the displaying of the augmented version of the image includes replacing the image of the suture with the augmented version of the image.

11. The robotic surgery system of claim 9, wherein the displaying of the augmented version of the image includes shading the augmented version of the image based on the detected force.

12. The robotic surgery system of claim 9, wherein the color indicates whether the detected force is within a target range.

13. The robotic surgery system of claim 9, wherein the displaying of the augmented version of the image includes displaying a legend indicating how color corresponds to force.

14. The robotic surgery system of claim 9, wherein the detecting of the force applied to the suture is performed by way of sensors located in a surgical instrument associated with one of the plurality of robotic arms and configured to detect force applied to the suture and communicate the detected force to the processor and memory.

15. The robotic surgery system of claim 9, wherein the detecting of the force applied to the suture is performed by way of torque sensors located in an instrument drive unit used to move one of the plurality of robotic arms and configured to detect the force applied to the suture and communicate the detected force to the processor and memory.

16. A laparoscopic surgery system comprising:
   a plurality of laparoscopic instruments configured to place a suture;
   an endoscope configured to view placement of the suture and communicate an image of the suture to a display;
   a processor; and
   memory coupled to the processor, the memory storing instructions which, when executed by the processor, cause the laparoscopic surgery system to:
   detect a force applied to the suture;
   identify, in a table that associates a plurality of colors to a plurality of forces, respectively, a color associated with the force applied to the suture;

generate an augmented version of the image wherein the identified color is used to represent at least a portion of the suture; and display the augmented version of the image.

17. The laparoscopic surgery system of claim 16, wherein the detecting of the force applied to the suture is performed by way of a sensor on one of the plurality of the laparoscopic instruments, the sensor configured to detect the force applied to the suture and communicate the force to the processor and memory.

18. The laparoscopic surgery system of claim 16, wherein the color indicates whether the detected force is within a target range.

\* \* \* \* \*